No. 657,089. Patented Sept. 4, 1900.
J. L. COUSINS.
EGG TRAY FOR INCUBATORS.
(Application filed Sept. 7, 1899.)
(No Model.)
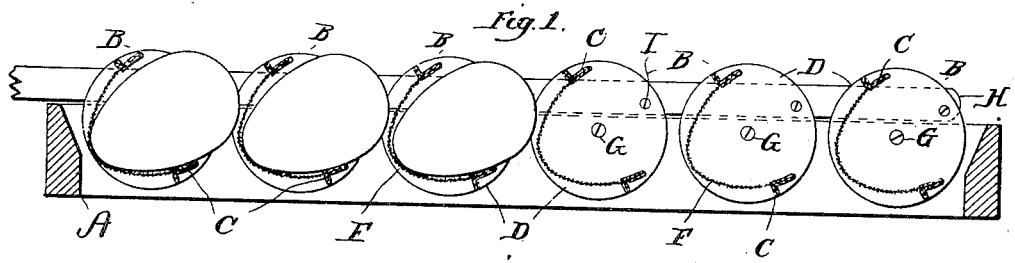
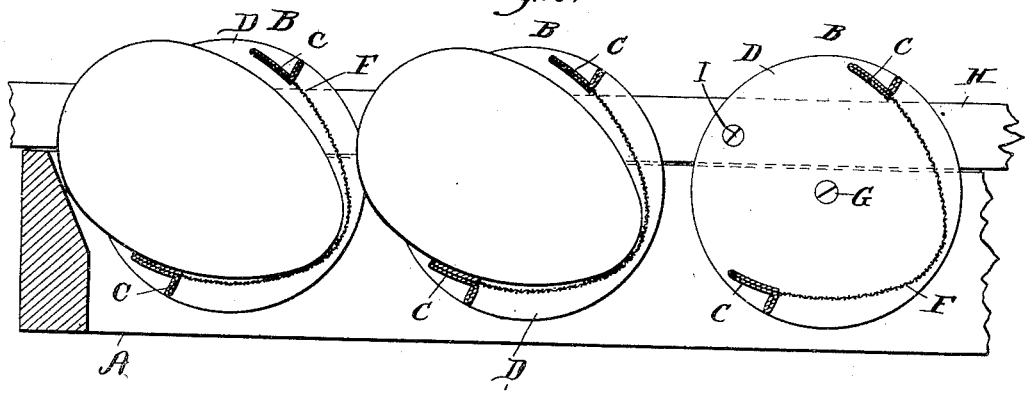
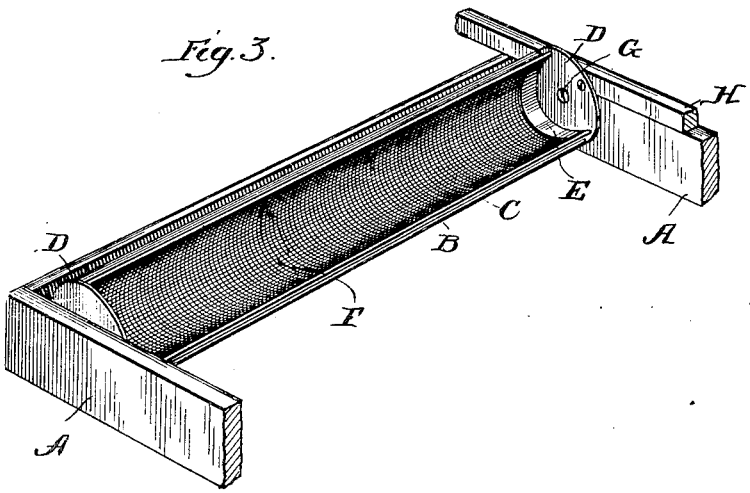
Witnesses:
H. B. Hallock.
E. C. Wurdeman
Inventor:
Jason L. Cousins
by Geo. Hazelton
Attorney.

UNITED STATES PATENT OFFICE.

JASON L. COUSINS, OF WARREN, PENNSYLVANIA.

EGG-TRAY FOR INCUBATORS.

SPECIFICATION forming part of Letters Patent No. 657,089, dated September 4, 1900.

Application filed September 7, 1899. Serial No. 729,746. (No model.)

*To all whom it may concern:*

Be it known that I, JASON L. COUSINS, a citizen of the United States, residing at Warren, county of Warren, and State of Pennsylvania, have invented a certain new and useful Improvement in Automatic Egg-Turning Trays for Incubators, of which the following is a specification.

My invention relates to a new and useful improvement in automatic egg-turning trays for incubators, and has for one object to provide a simple and effective device of this description, whereby the eggs contained within an incubator may be turned through one hundred and eighty degrees, while at all times maintaining their small ends below the level of the large ends thereof, in order to produce the best effect in hatching; and a further object of my invention is to prevent any jar or jostling of the eggs during this operation, which would tend to lessen their chance of successful hatching.

With these ends in view the invention consists in the details of construction and combination of elements hereinafter set forth and then specifically designated by the claim.

In order that those skilled in the art to which this invention appertains may understand how to make and use the same, its construction and operation will now be described in detail, referring to the accompanying drawings, forming a part of this specification, in which—

Figure 1 is a longitudinal section of a portion of a tray made in accordance with my improvement, showing the eggs held therein upon one side at an angle; Fig. 2, a similar view enlarged, showing the eggs turned upon the opposite side, one of the pockets or receptacles being empty to illustrate the construction; and Fig. 3, a perspective of one end of a tray, fully illustrating the construction and arrangement of one of the pockets.

In carrying out my invention as here embodied I provide a tray A, which may be of any desired shape or size, here shown as rectangular. Within this tray and to the sides thereof are pivoted a series of shelves or supports B, which are constructed as follows: Strips C, preferably of sheet metal, such as tin, form the upper edges of the supports or shelves, and these strips may be of L shape, as clearly shown in Figs. 1 and 2, for the purpose of strengthening said strips. The ends of the shelves are composed of the disks D, which have projecting therefrom bands E, to which latter the ends of strips C are secured, and the remainder of the shelf is formed by a suitable netting F, preferably of wire, which is secured to the strips C and bands E in such manner as to form a trough the cross-section of which is approximately the shape of the small end of the egg.

The pivoting of the supports is effected by small screws, nuts, pins, or other proper appliances G, passed through the centers of the disks and into the side rails of the tray, as clearly shown in Fig. 3, and the shelves are connected together, so as to move in unison, by the rod H being pivoted to each of the disks at I.

From this description it will be seen that when each of the shelves or supports has been filled with eggs and set upon their ends, as clearly shown, the position of these eggs may be altered without disturbing one of the eggs relative to the supports in which they are held. Thus when the supports are in a horizontal position the eggs will stand vertically upon their small ends, and when it is necessary to produce the best results in incubation the eggs may be turned upon one side and then upon the other, while at all times maintaining their small ends slightly lower than their large ends.

In practice, the end of the rod H may extend beyond the end of the tray for easy access, so that when it is required to change the position of the eggs the bar may be pulled to the position shown in Fig. 2, thus causing all the eggs to lie somewhat upon one side, while by pushing the bar to the opposite position they will lie upon the opposite side, and it will be obvious that this result may be brought about without jar or jostle to the eggs, thereby in no wise injuring the same, and yet giving them the change of position which is necessary for the best effects in incubation.

One of the principal objects of forming the body of the shelves of netting is to permit the free passage of the air contained within the incubator, which is set in circulation by the heat applied thereto in the well-known manner.

I do not wish to limit myself to the exact shape or size of the tray or the number of pockets carried by the support, since these may be varied without departing from the spirit of my invention, which rests in the broad idea of providing for the support of each egg individually and for each and every row of eggs, permitting at the same time turning from side to side without harm.

Having thus fully described my invention, what I claim as new and useful is—

In an incubator, a tray, a series of disks pivoted to the tray, an operating-bar pivoted to each of the disks, flanges formed with the disks, wire-netting secured to the flanges in such manner as to form a trough, the cross-section of which is approximately the shape of the small end of an egg, strips secured at each end to the flanges bent to form L-shaped upper edges for the shelves, with the edges of the wire-netting of the shelves clamped between the folds of the strips, substantially as described.

In testimony whereof I have hereunto affixed my signature in the presence of two subscribing witnesses.

JASON L. COUSINS.

Witnesses:
C. M. SHAWKEY,
H. J. SHAWKEY.